United States Patent [19]
Blaud et al.

[11] Patent Number: 6,100,718
[45] Date of Patent: Aug. 8, 2000

[54] CIRCUIT FOR TRANSMITTING DIGITAL SIGNALS

[75] Inventors: Phillppe Blaud, Villingen-Schwenningen; Albrecht Rothermel, Neu-Ulm; Rainer Schweer, Niedereschoch, all of Germany

[73] Assignee: Deutsche Thomson-Brandt GmbH, Villingen-Schwenningen, Germany

[21] Appl. No.: 08/737,940

[22] PCT Filed: Apr. 5, 1995

[86] PCT No.: PCT/EP95/01248

§ 371 Date: Apr. 28, 1997

§ 102(e) Date: Apr. 28, 1997

[87] PCT Pub. No.: WO95/28049

PCT Pub. Date: Oct. 19, 1995

[30] Foreign Application Priority Data

Apr. 7, 1994 [DE] Germany ............... 44 11 816

[51] Int. Cl.[7] ............ H03K 19/0175; H03K 19/094
[52] U.S. Cl. ............ 326/86; 326/86; 326/83; 326/30; 326/17; 326/121; 326/113
[58] Field of Search .............. 326/83, 86, 30, 326/17, 24, 27, 121, 118, 113

[56] References Cited

U.S. PATENT DOCUMENTS

| | | | |
|---|---|---|---|
| 3,974,404 | 8/1976 | Davis | 307/303 |
| 5,528,190 | 6/1996 | Honnigford | 327/328 |
| 5,541,526 | 7/1996 | Sandhu | 326/17 |
| 5,656,951 | 8/1997 | Hu et al. | 326/81 |

FOREIGN PATENT DOCUMENTS 0391571  10/1990  European Pat. Off. .

*Primary Examiner*—Mike Tokar
*Assistant Examiner*—Vibol Tan
*Attorney, Agent, or Firm*—Joseph S. Tripoli; Eric P. Herrmann; Ronald H. Kurdyla

[57] ABSTRACT

A circuit, for processing high frequency digital signals minimizes radiation interference by reducing voltage swings at the circuit input. This is accomplished by forming circuit input structures, which exhibit very low input impedances. An example of such input circuitry is a common gate amplifier with a diode coupling the source electrode of the common gate amplifier to ground potential and input signal applied to the source electrode. Output signal is derived from the collector of the common gate electrode which has a further diode as a load circuit.

7 Claims, 1 Drawing Sheet

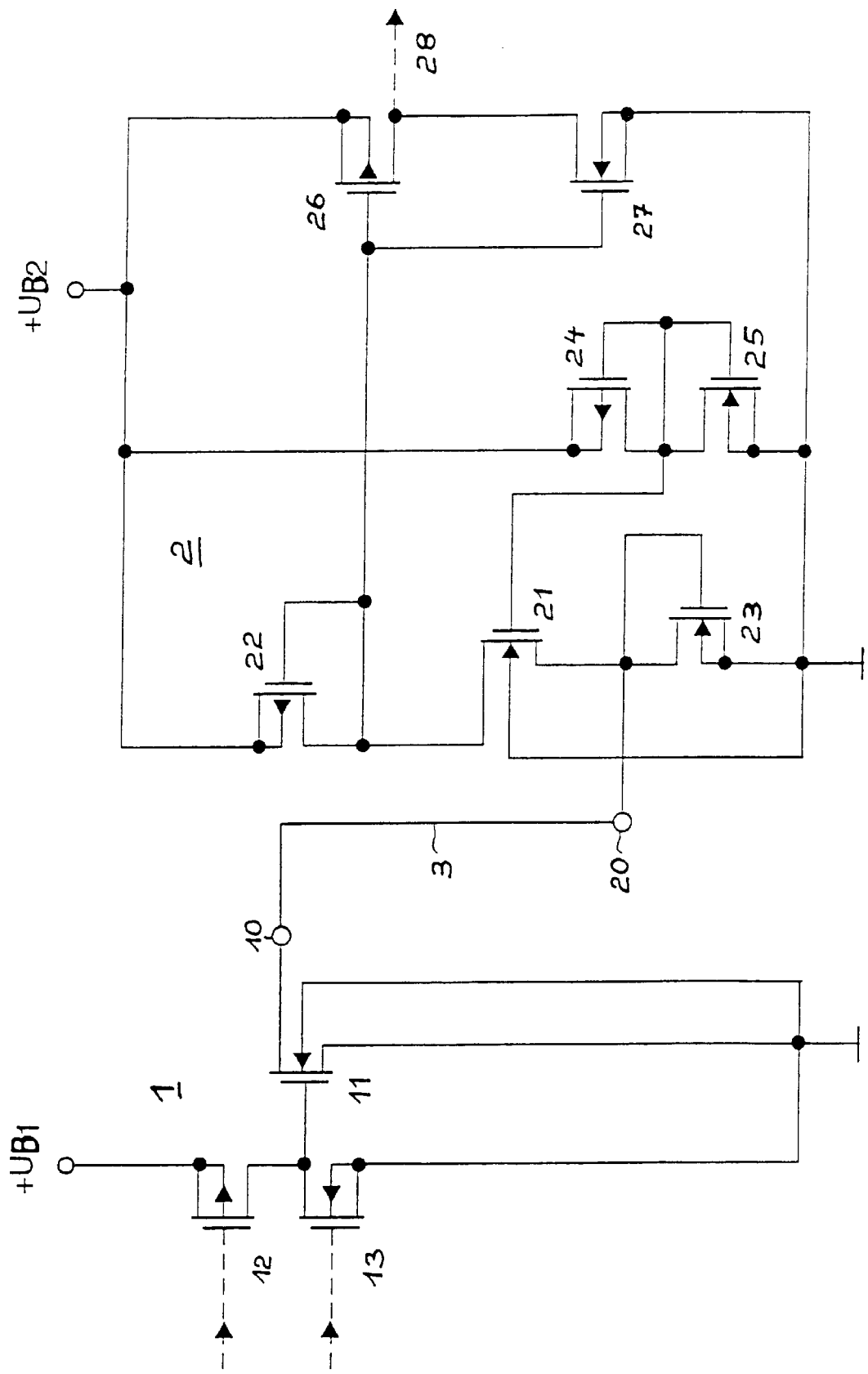

CIRCUIT FOR TRANSMITTING DIGITAL SIGNALS

The invention relates to an electronic circuit for transmitting and/or processing signals, in particular digital signals, according to the precharacterizing clause of claim 1.

On account of the technical progress made in signal processing and the integration of electronic circuit components or circuits, also known as ICs for short, more and more digital signals have to be transmitted at in each case ever higher clock frequency between these circuits, for example in a television set. This means that more connecting lines are also required for the digital signal transmission.

With the conventional transmission standards, such as for example with TTL, CMOS and ECL levels, problems increasingly arise here with regard to the power consumption of the ICs on the one hand and to the disturbance of sensitive circuit components, such as for example sensitive receiving components of a television set, by radiated interference on the other hand.

Such disturbances can be avoided in many cases just by selected circuit arrangements or routing layouts. In other cases, however, additional screening measures against the radiated interference caused by the transmission of digital signals are also required.

It is the object of the invention to reduce the radiated interference in a transmission of digital signals.

This object is achieved by the invention specified in claim 1. Advantageous further developments of the invention are specified in the subclaims.

The invention is based on the idea of reducing the voltage swing between the signal levels high (H) and low (L) on the connecting lines each transmitting a data signal for a data transmission which has little radiated interference.

In principle, the aim here is for such a low-impedance input resistance of the respective signal input, receiving a digital signal, of a circuit transmitting and/or processing digital signals, which may be part of an IC, that the respective signal input can be current-controlled by the digital-signal source which is respectively assigned to it and is feeding it, or can be controlled with a small voltage level swing.

The input resistance is formed according to the invention by a transistor operated in gate connection and used as a signal input amplifier. The very high-impedance digital-signal source, respectively feeding a signal input via a connecting line, may be realized, for example, by an open-drain output.

The current controlling of the low-impedance signal input of a respective input amplifier with a high-impedance signal source in this case effects a small level swing, which for its part has the consequence of a drastically reduced radiated interference, in particular on the connecting lines each carrying a data signal.

The current controlling of the respective signal input has, furthermore, the consequence that the level swing, or at least one of the logic levels which are established at the signal input, can be determined by the circuit design of the respective signal input amplifier receiving a digital signal, it being not the input resistance which determines the voltage level but essentially the reference voltage at the gate of a field-effect transistor operated in gate connection, which is used for example as a signal input amplifier. For this reason, this principle of the current controlling of the signal input according to the invention is of outstanding significance for the transmission of digital signals between various ICs with CMOS technology, since this current controlling also permits between such ICs a digital signal transmission with a small level swing which has little radiated interference. Furthermore, it is ensured by this current controlling of the respective signal input that, for example, different earth potentials of ICs sending digital signals and receiving digital signals have no influence, within certain limits, on a detected signal level at the respective signal input of the IC receiving the digital signals.

The use of an open-drain output as the digital-signal source has, moreover, the advantage that a data transmission can be performed with little power, a drastic reduction in the coupling in of external signals or external voltages, in particular on the respective connecting line, being brought about by the abovementioned current controlling of the low-impedance signal input, and consequently the necessary interference immunity of the small digital-signal level swing being ensured. On account of the low level swing on the respective connecting line, the charge-reversal losses are relatively low. Consequently, the leakage power requirement of the overall circuit also becomes lower.

It has proved to be the case that very high data rates can be transmitted with such a signal transmission, possibly leading to the necessity that the line characteristics of the connecting lines also have to be taken into consideration. This is namely always the case whenever the signal propagation time approaches the order of magnitude of the rate of signal rise.

On a printed circuit board, which is customarily used today for the arrangement of ICs together, a relative dielectric constant of about 3.5 can be assumed. This gives a signal propagation time of about 0.5 ns for 10 cm of line length. This of course means in principle that the reflections at the line ends must be kept as small as possible. This gives rise to the requirement for the respective connecting line to be terminated by its characteristic impedance.

If the input resistance of the respective signal input is equal to the characteristic impedance of the respective connecting line, the voltage swing at the respective signal input of this IC receiving digital signals is of course no longer just as small as is required. To give an idea of the order of magnitude, in the case of a current of, for example, 2 mA for the data transmission and a characteristic impedance of, for example, 150 ohms, a signal swing of 300 mV is obtained at the respective signal input of the IC receiving digital signals. This signal swing is thus predetermined by the line characteristics and is not limited by the amplifier characteristics of the respective signal input amplifier of the IC receiving digital signals.

In this respect it should also be noted that a reduction in the input resistance below the characteristic impedance for the purpose of reducing the radiated interference would not be meaningful, because a high-frequency transient current feeding from the respective signal output of the IC sending digital signals into the connecting line would in any case have the effect of a voltage jump, of in this case 300 mV, at the respective signal output of the IC sending digital signals.

The invention is explained in more detail below in an exemplary embodiment with reference to a drawing.

The single figure shows circuit arrangements 1 and 2, referred to hereinafter as first circuit arrangement and second circuit arrangement, which are interconnected by a connecting line 3 serving for the transmission of a digital signal and can both be integrated in an IC each. The first circuit arrangement 1 in this case forms part of an IC sending a digital signal and the second circuit arrangement 2 forms part of an IC receiving the digital signal. The connecting line 3 may be realized, for example, by a conductor track of a printed circuit board.

The connecting line 3 connects the digital signal output 10 of a field-effect transistor 11, which is connected as an open drain and by which it is intended to represent one of a plurality of identical signal output stages of the first circuit arrangement 1, to the signal input 20 of an input stage of the second circuit arrangement 2, the said input stage being designed as a gate circuit with a field-effect transistor 21. The driving of the respective signal output stages of the first circuit arrangement 1 is performed in each case via complementary field-effect transistors, as is represented by the complementary field-effect transistors 12 and 13, which are connected in series between reference potential (earth) and a positive operating voltage $+U_{B1}$, for the driving of transistor 11.

The input stage designed as a gate circuit represents one of a plurality of identical input stages of the second circuit arrangement 2. The transistor 21 operated in gate connection is preferably an n-channel type, like the transistor 11 of the respective output stage, connected as an open drain.

According to the invention, provided as the load for the transistor 21 of the respective input stage is a p-channel transistor 22, which is operated in diode connection and is connected between the operating voltage $+U_{B2}$ of the second circuit arrangement 2 and the drain terminal of transistor 21. In this case, the connection of the drain terminal of transistor 21 to the shorted drain and gate of transistor diode 22, referred to hereinafter as the second transistor diode 22, forms the signal output of the respective input stage, from which the amplified digital signal is fed to the signal input of a further amplifying stage, known per se.

With this known stage which is connected between earth and the operating voltage $+U_{B2}$ and comprises two complementary field-effect transistors 26 and 27 in push-pull operation, the digital signal already amplified in the voltage amplitude is further amplified, for example to full CMOS level swing, for an internal signal processing, for example within the second circuit arrangement 2, which is intended to be symbolically represented with the signal forwarding by the dashed line 28 exhibiting an arrow at the signal output of this stage.

According to the invention, the source terminal, connected to a digital signal input 20, of the respective transistor 21 operated in gate connection is connected to earth via an n-channel field-effect transistor 23, which is operated in diode connection and is referred to hereinafter as the first transistor diode 23. The mode of operation of this transistor diode 23 and also that of the second transistor diode 22 is described later.

For generating a constant gate potential of the respective transistor 21 operated in gate connection, preferably two complementary field-effect transistors 24 and 25 operated in diode connection are used. These two transistors 24 and 25 operated in diode connection, referred to hereinafter as the third transistor diode 24 and fourth transistor diode 25, are connected in series between the operating voltage $+U_{B2}$ and earth. The realization of the voltage source by the third transistor diode 24 and fourth transistor diode 25 makes the circuit arrangement robust with respect to process data variations and with respect to temperature and operating-voltage fluctuations.

The mode of operation of the exemplary circuit arrangements 1 and 2, which are preferably realized by self-blocking enhancement MOSFETs, is described in more detail below:

If the respective output transistor 11 of the circuit arrangement 1 sending digital signals is turned on and, as a result, carries L level, a corresponding current flows from the operating voltage source $U_{B2}$ via the second transistor diode 22 and the transistor 21, operated in gate connection, of the input stage via the connecting line 3 into the output transistor 11.

Apart from its function as a load resistance, the second transistor diode 22 also ensures reliable functioning of the circuit in the event of operating-voltage and temperature fluctuations and in the event of parameter variations of the transistors on account of the curved diode characteristic, which is characteristic of field-effect transistor diodes. If, namely, the drain of transistor 21 were to have the tendency at L level to reach the source potential, for example on account of one or more of the abovementioned influences, the source potential would move towards the reference potential (earth). This effect is substantially prevented by the second transistor diode 22, in that the latter ensures that, if in the worst case the drain potential of transistor 21 happens to drop too far, its internal resistance becomes lower and lower in impedance, as a result of which the drain potential is then, in principle, fixed and consequently a further dropping of the source potential of transistor 21 is avoided, or at least it is attenuated to the extent that the functioning of the circuit is not impaired.

If the respective output transistor 11 of the circuit arrangement 1 sending digital signals is then turned off and, as a result, carries H level, the connecting line 3 is virtually currentless.

If, as a result, the input stage designed as a gate circuit were also to be made currentless by the control system, the coupling in of charges such as, for example due to electrostatic induction, on the connecting line 3 could raise the signal input 20 to a higher potential, so that the source potential of transistor 21 would run away in the direction of the positive potential of the operating voltage $U_{B2}$. This is avoided by the first transistor diode 23 drawing just enough current that any charges which may occur at the signal input 20 on account of the abovementioned disturbing influences can be dissipated.

Due to the fact that, with H signal at the respective output transistor 11, the first transistor diode 23 draws a current, it contributes to the connecting line 3 being terminated approximately with its characteristic impedance even with H level at the signal input 20.

In the cooperation according to the invention with the second transistor diode 22, in that the latter, as already mentioned, prevents excessive dropping of the drain potential of transistor 21, the first transistor diode 23 ensures furthermore that, in the event of so-called overshoots, which may occur for example when switching over from L level to H level on the connecting line 3, the input resistance of the signal input 20 virtually cannot rise beyond the characteristic impedance of the connecting line 3.

If, namely, the input stage were to become completely currentless with H level at the signal input 20, the connecting line would no longer be terminated.

This principle of digital signal transmission with small logic level swing has, moreover, the advantage that the respective output stage of the circuit arrangement 1 sending digital signals can be formed by relatively small field-effect transistors, "small" essentially meaning the channel width of the respective output transistor 11.

In a trial circuit, self-blocking enhancement MOSFETs with the following channel parameters were used.

| Transistor [Designation] | Channel width [in μm] | Channel length [in μm] |
| --- | --- | --- |
| 11 | 15 | 0.7 |
| 21 | 200 | 0.7 |
| 22 | 36 | 0.7 |
| 23 | 50 | 0.7 |
| 24 | 22 | 0.7 |
| 25 | 11 | 0.7 |
| 26 | 22 | 0.7 |
| 27 | 11 | 0.7 |

The invention is not restricted to the transmission and/or processing of digital signals.

We claim:

1. Electronic circuit arrangement for signal processing digital signals, comprising:

an input for receiving a digital signal and an output;

a field-effect transistor having a gate electrode coupled to constant gate potential, a source electrode coupled via a first diode to a reference potential, and a drain electrode via a second diode to a supply voltage, wherein said input and said output are connected to the source and drain electrodes of said field effect transistor respectively;

said circuit arrangement having an input resistance formed by said field-effect transistor and the first diode.

2. The electronic circuit arrangement set forth in claim 1, wherein the first diode is formed by a second field-effect transistor, the source electrode of which is coupled to the reference potential, and the gate electrode and the drain electrode of which are coupled to the source electrode of said field-effect transistor.

3. The electronic circuit arrangement set forth in claim 1, wherein said field-effect transistor is operated with a load which is connected between its drain electrode and the supply voltage and which is formed by the second diode.

4. The electronic circuit arrangement set forth in claim 3, wherein the second diode is formed by a third field-effect transistor, the source electrode of which is coupled to the supply voltage, and the gate electrode and the drain electrode of which are coupled to the drain electrode of said field-effect.

5. The electronic circuit arrangement set forth in claim 1, wherein the third field-effect transistor is of complementary type to both said field-effect transistor and said second field-effect transistor.

6. The electronic circuit arrangement set forth in claim 1, wherein a voltage source is coupled to the gate electrode of said field-effect transistor.

7. The electronic circuit arrangement set forth in claim 6, wherein the voltage source is formed by series-connected diodes, which are preferably realized by field-effect transistors, and which is coupled between said supply voltage and said reference potential.

* * * * *